(12) United States Patent
Iyama et al.

(10) Patent No.: US 9,180,392 B2
(45) Date of Patent: Nov. 10, 2015

(54) MIXED-FIBER NONWOVEN FABRIC AND FILTER MEDIUM USING THE SAME

(71) Applicant: TORAY INDUSTRIES, INC., Tokyo (JP)

(72) Inventors: Yuji Iyama, Otsu (JP); Akito Kuroda, Otsu (JP); Yoshikazu Yakake, Otsu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 14/360,852

(22) PCT Filed: Nov. 27, 2012

(86) PCT No.: PCT/JP2012/080576
§ 371 (c)(1),
(2) Date: May 27, 2014

(87) PCT Pub. No.: WO2013/080955
PCT Pub. Date: Jun. 6, 2013

(65) Prior Publication Data
US 2014/0305306 A1   Oct. 16, 2014

(30) Foreign Application Priority Data

Nov. 28, 2011   (JP) .................................. 2011-258765

(51) Int. Cl.
*B01D 39/00*   (2006.01)
*B01D 39/14*   (2006.01)
(Continued)

(52) U.S. Cl.
CPC ................. *B01D 39/14* (2013.01); *B01D 39/16* (2013.01); *B03C 3/28* (2013.01); *B03C 3/66* (2013.01);
(Continued)

(58) Field of Classification Search
CPC .......... B01D 39/1623; B01D 39/2055; B01D 39/2065; B01D 46/01; B01D 46/546
USPC ......... 55/486, 488, 527–528; 96/80; 210/435, 210/489, 502.1, 504–505
See application file for complete search history.

(56) References Cited

U.S. PATENT DOCUMENTS 3,981,650 A    9/1976  Page
2008/0026659 A1  1/2008  Brandner et al.
(Continued)

FOREIGN PATENT DOCUMENTS

DE    10 2006 013 170 A1    9/2007
JP         61-289177 A     12/1986
(Continued)

OTHER PUBLICATIONS

International Search Report for International PCT Application No. PCT/JP2012/080576 mailed Feb. 5, 2013.
(Continued)

*Primary Examiner* — Robert Clemente
*Assistant Examiner* — Karla Hawkins
(74) *Attorney, Agent, or Firm* — RatnerPrestia

(57) ABSTRACT

A nonwoven fabric includes mixed fibers having different fiber diameters. A group of fibers having a fiber diameter of 5.0 μm or less (fiber group A) is present at a volume fraction of 20 to 80 vol %, a group of fibers having a fiber diameter of 50.0 μm or more (fiber group B) is present at a volume fraction of 1 to 40 vol %, and a group of fibers having a fiber diameter of more than 5.0 μm and less than 50.0 μm (fiber group C) is present at a volume fraction of 0 to 79 vol %. The ratio of the median fiber diameter (B') of fiber group B to the median fiber diameter (A') of fiber group A (B'/A') is 35 or more.

14 Claims, 1 Drawing Sheet

(51) Int. Cl.
  *B01D 39/16* (2006.01)
  *B03C 3/28* (2006.01)
  *D04H 3/016* (2012.01)
  *D04H 3/153* (2012.01)
  *D04H 3/16* (2006.01)
  *D04H 1/4382* (2012.01)
  *D04H 1/56* (2006.01)
  *B03C 3/66* (2006.01)

(52) U.S. Cl.
  CPC ............... *D04H 1/4382* (2013.01); *D04H 1/56* (2013.01); *D04H 3/016* (2013.01); *D04H 3/153* (2013.01); *D04H 3/16* (2013.01)

(56) References Cited

U.S. PATENT DOCUMENTS

2009/0117803 A1   5/2009  Jung et al.
2010/0307119 A1* 12/2010  Leung et al. .................. 55/488

FOREIGN PATENT DOCUMENTS

| JP | 63-280408 | | 11/1988 |
| JP | 5-68824 | A | 3/1993 |
| JP | 11-104417 | A | 4/1999 |
| JP | 11-131353 | | 5/1999 |
| JP | 2000-239955 | A | 9/2000 |
| JP | 2001-321620 | A | 11/2001 |
| JP | 2002-018216 | A | 1/2002 |
| JP | 2006 037295 | | 2/2006 |
| JP | 2009-531554 | A | 9/2009 |
| JP | 2010-64010 | A | 3/2010 |
| WO | WO 2008/016771 | A1 | 2/2008 |

OTHER PUBLICATIONS

International Preliminary Report, for PCT/JP2012/080576 dated Jun. 3, 2014.
Supplementary European Search Report for Application No. EP 12 85 3901 dated Jun. 17, 2015.

* cited by examiner

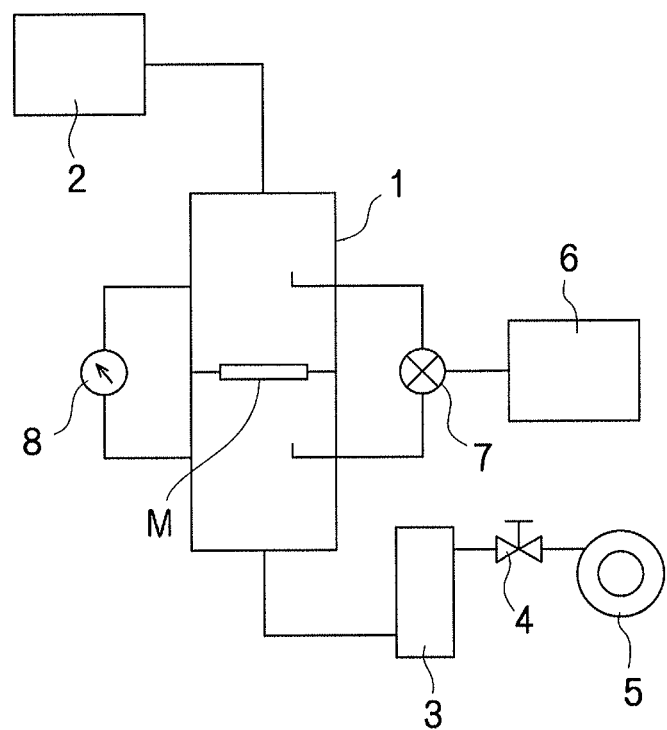

MIXED-FIBER NONWOVEN FABRIC AND FILTER MEDIUM USING THE SAME

CROSS REFERENCE TO RELATED APPLICATIONS

This is the U.S. National Phase application of PCT/JP2012/080576, filed Nov. 27, 2012, which claims priority to Japanese Patent Application No. 2011-258765, filed Nov. 28, 2011, the disclosures of each of these applications being incorporated herein by reference in their entireties for all purposes.

FIELD OF THE INVENTION

The present invention relates to a mixed-fiber nonwoven fabric suitable for air filters and a filter medium using the same. Specifically, the present invention relates to a high-performance mixed-fiber nonwoven fabric capable of exhibiting a low pressure drop and a high collection efficiency and a filter medium using the high-performance mixed-fiber nonwoven fabric and being suitable for air filters.

BACKGROUND OF THE INVENTION

Air filters have been used to remove pollen, dust, and the like in the air. Air filters use filter media, which are often made of nonwoven fabrics. Nonwoven fabrics are produced by various processes, and among them melt-blowing process is widely employed for the production of filter media for air filters, battery separators, and the like. Melt-blowing process is generally a process in which hot-air blows a thermoplastic polymer extruded from a spinneret to form fine filaments and the filaments self-bond together into a fiber web. As compared with other production processes of nonwoven fabrics (e.g. spun-bonding), melt-blowing process has the advantages of requiring no complicated operations and being capable of easily producing fine fibers several micrometers to several tens micrometers in diameter.

Air filters are required to have performance such as capabilities of collecting a large amount of fine dust (high collection efficiency) and of exhibiting low resistance to airflow passing through the air filters (low pressure drop). For providing a filter medium exhibiting a high collection efficiency, a nonwoven fabric formed from fibers having a small fineness is suitable. However, the structure of such a nonwoven fabric is likely to easily collapse, which increases the fiber density resulting in an increased pressure drop. For providing a filter medium exhibiting a low pressure drop, a nonwoven fabric formed from fibers having a large fineness is suitable. However, the fiber surface area of such a nonwoven fabric decreases resulting in a decreased collection efficiency. Thus, a high collection efficiency is incompatible with a low pressure drop.

For solving the above problems, an attempt has been made to simultaneously satisfy a high collection efficiency and a low pressure drop by utilizing not only physical properties but also electrostatic properties through electret treatment of a nonwoven fabric.

For example, a method for producing an electret nonwoven fabric has been proposed, the method comprising bringing a nonwoven fabric in contact with a ground electrode, and applying a high voltage to the nonwoven fabric with a non-contact voltage applying electrode, while moving the ground electrode that carries the nonwoven fabric, thereby performing continuous electret treatment (see Patent Literature 1). In this method, electrons are injected into the nonwoven fabric, ions are transferred, and dipoles are oriented. As a result, polarization is induced and a charge is imparted to the nonwoven fabric.

Another proposed method comprises adding an additive to fibers to be formed into a nonwoven fabric, thereby producing a nonwoven fabric exhibiting a high collection efficiency and a low pressure drop. For example, a heat resistant electret material has been proposed, the heat resistant electret material being made of a polymer material containing at least one stabilizer selected from a hindered amine stabilizer, a nitrogen-containing hindered phenol stabilizer, a metallic salt-hindered phenol stabilizer and a phenol stabilizer and having a trapped charge of $2.0 \times 10^{-10}$ coulomb/cm$^2$ or more as determined by thermally stimulated depolarization currents at a temperature of 100° C. or higher (see Patent Literature 2).

Still other proposed methods include a production method of a meltblown nonwoven fabric comprising mixed filaments made of different polymers with different characteristics (Patent Literature 3) and a production method of a nonwoven fabric in which fine fibers and coarse fibers are mixed so as to reduce the collapse of the nonwoven fabric structure and thereby to suppress an increase in pressure drop (see Patent Literature 4 and 5). However, Patent Literature 3 describes no specific combination of fiber diameters suitable for filters. Patent Literature 4 describes that a mixed-fiber nonwoven fabric in which fibers having different fiber diameters of 1 to 10 μm are appropriately mixed and dispersed is suitable for filters. However, a mixed-fiber nonwoven fabric comprising only fibers having a fiber diameter of less than 10 μm failed to achieve a sufficient effect of suppressing an increase in pressure drop especially when used as a filter medium for air filters. Patent Literature 5 discloses a method in which fibers having fiber diameters of more than 10 μm are mixed. However, the method requires a high mass per unit area in order to achieve a sufficient collection efficiency and thus the production cost for a filter medium will increase.

As described above, there has been no method capable of achieving good balance between the collection efficiency and the pressure drop and capable of producing an inexpensive filter medium.

PATENT LITERATURE

Patent Literature 1: JP 61-289177 A
Patent Literature 2: JP 63-280408 A
Patent Literature 3: U.S. Pat. No. 3,981,650
Patent Literature 4: Japanese Patent No. 3753522
Patent Literature 5: Japanese Patent No. 3703986

SUMMARY OF THE INVENTION

The present invention aims to provide a nonwoven fabric exhibiting a low pressure drop and an excellent collection efficiency. Specifically, the present invention aims to provide a mixed-fiber nonwoven fabric suitable for air filters, and a filter medium using the mixed-fiber nonwoven fabric.

The present invention was made in order to solve the above problems. The present invention includes a nonwoven fabric comprising mixed fibers having different fiber diameters, the mixed-fiber nonwoven fabric comprising fiber group A, which is a group of fibers having a fiber diameter of 5.0 μm or less; fiber group B, which is a group of fibers having a fiber diameter of 50.0 μm or more; and fiber group C, which is an optional group of fibers having a fiber diameter of more than 5.0 μm and less than 50.0 μm; fiber group A being present at a volume fraction of 20 to 80 vol %, fiber group B being present at a volume fraction of 1 to 40 vol %, and fiber group C being present at a volume fraction of 0 to 79 vol %, relative to the total volume of the fibers; and fiber group A having a median fiber diameter (A'), fiber group B having a median fiber diameter (B'), and the ratio of (B'/A') being 35 or more.

In a preferred embodiment of the mixed-fiber nonwoven fabric of the present invention, fiber group A is present at a volume fraction of 30 to 70 vol %, fiber group B is present at a volume fraction of 5 to 30 vol %, and fiber group C is present at a volume fraction of 0 to 65 vol %.

The term "fiber diameter" herein refers to the diameter of a fiber when the cross section of the fiber is perfect circle. When the cross section of a fiber is not perfect circle, the term "fiber diameter" refers to the maximum diameter of the cross section that is perpendicular to the axial direction of the fiber.

The term "median" as used in the term "median fiber diameter" herein refers to a median generally used in statistics. In other words, the median fiber diameter is determined as follows. The fiber diameters of n pieces of fibers are determined for each fiber group and are arranged in ascending order, i.e., $x_1, x_2, x_3, \ldots, x_n$. When n is odd, the median fiber diameter of each fiber group is $x_{(n+1)/2}$. When n is even, the median fiber diameter is $(x_{n/2}+x_{(n/2+1)})/2$.

In a preferred embodiment of the mixed-fiber nonwoven fabric of the present invention, the nonwoven fabric is a meltblown nonwoven fabric.

In a preferred embodiment of the mixed-fiber nonwoven fabric of the present invention, fiber group A or fiber groups A and B comprise a polyolefin fiber.

In a preferred embodiment of the mixed-fiber nonwoven fabric of the present invention, the mixed-fiber nonwoven fabric has a mass per unit area of 10 to 80 g/m².

In a preferred embodiment of the mixed-fiber nonwoven fabric of the present invention, the nonwoven fabric is an electret-treated nonwoven fabric.

In a preferred embodiment of the mixed-fiber nonwoven fabric of the present invention, the nonwoven fabric has a collection efficiency of 99.9% or more for polystyrene particles having a particle diameter of 0.3 to 0.5 μm at a filtration velocity of 4.5 m/min and has a QF of 0.20 or more.

In the present invention, a filter medium suitable for air filters can be produced by using the mixed-fiber nonwoven fabric.

The present invention provides a mixed-fiber nonwoven fabric exhibiting a low pressure drop and an excellent collection efficiency and a filter medium comprising the mixed-fiber nonwoven fabric and being especially suitable for air filters.

BRIEF DESCRIPTION OF THE DRAWING

FIG. 1 is a schematic view showing a device for measuring collection efficiency and pressure drop.

DETAILED DESCRIPTION OF EMBODIMENTS OF THE INVENTION

The mixed-fiber nonwoven fabric of embodiments of the present invention is a nonwoven fabric comprising mixed fibers having different fiber diameters.

The mixed-fiber nonwoven fabric of the present invention preferably comprises fibers made of a non-conductive material as a main component. The non-conductive material herein preferably has a volume resistivity of $10^{12} \cdot \Omega \cdot cm$ or more, more preferably $10^{14} \cdot \Omega \cdot cm$ or more.

Examples of the non-conductive material include polyolefins such as polyethylene and polypropylene; polyesters such as polyethylene terephthalate, polytrimethylene terephthalate, polybutylene terephthalate, and polylactic acid; polycarbonate; polystyrene; polyphenylene sulfide; fluorine resins; elastomers such as polystyrene elastomers, polyolefin elastomers, polyester elastomers, polyamide elastomers, and polyurethane elastomers; and copolymers and mixtures thereof. Among them, a material containing a polyolefin as a main component is preferred because such a material notably exhibits electret properties. More preferred is polypropylene.

Fiber group A and fiber group B having different fiber diameters may comprise different fibers made of different types of polymers. However, fine fibers greatly affect the electret properties of the fabric and thus fiber group A preferably comprises fibers made of polypropylene. Fiber group A and fiber group B will be described in more detail later.

The mixed-fiber nonwoven fabric of the present invention may be produced by, for example, melt-blowing process, spun-bonding process, electrospinning process, etc. Melt-blowing process is preferably employed because it requires no complicated operations and can produce both fine fibers and coarse fibers. The spinning conditions in melt-blowing process include the extrusion rate of a polymer, a polymer viscosity, a nozzle temperature, an air pressure, etc. Optimization of these spinning conditions allows the production of a mixed-fiber nonwoven fabric having a desired fiber diameter. Specifically, fibers having a desired fiber diameter can be obtained as follows. Finer fibers can be obtained through techniques such as reducing the extrusion rate of a polymer, using a polymer having a low viscosity, increasing the nozzle temperature, and increasing the air pressure. More coarse fibers can be obtained through techniques such as increasing the extrusion rate of a polymer, using a polymer having a high viscosity, reducing the nozzle temperature, and reducing the air pressure.

In another example, the mixed-fiber nonwoven fabric of the present invention can be produced by the method described in, for example, U.S. Pat. No. 3,981,650. This method uses a spinneret in which the same or different polymers can flow down through individual flow passages and can be extruded from individual holes that are alternately arranged in a row. In order to produce fine fibers and coarse fibers in this method, in addition to the same type of polymer, another polymer of a different type or a different viscosity may be spun into fibers and the fibers may be mixed. Also, the number of the holes through which polymers are extruded, the diameter of the holes, and the extrusion rates may be changed.

In another example, the mixed-fiber nonwoven fabric of the present invention may be produced by the method described in, for example, Japanese Patent No. 3753522. In this method, a polymer flowing down through a single flow passage is spun through a spinneret which can extrude the polymer from holes of different diameters arranged alternately in a row. In this production method, however, since the polymer flowing down through a single flow passage is distributed to each hole, there are limitation to achieving stable spinnability in terms of the hole diameter and the extrusion rate. Another method is described in Japanese Patent No. 3703986 in which staples are blown into meltblown fibers. This method requires a complicated apparatus and there may be cases where it is difficult to homogeneously mix fine fibers and coarse fibers.

From the above, in a preferred embodiment, the mixed-fiber nonwoven fabric of the present invention is produced by spinning process using the spinneret described in U.S. Pat. No. 3,981,650.

When fibers of the nonwoven fabric of the present invention are spun by melt-blowing process, the distance between a extrusion hole of the spinneret and a collector (die-collector distance) is preferably more than 10 cm and less than 30 cm, and is more preferably more than 15 cm and less than 25 cm to achieve good balance between pressure drop and collection efficiency. If the die-collector distance is 10 cm or less, fibers more than 50 μm in diameter contained in the nonwoven fabric of the present invention may be insufficiently cooled before being formed into a sheet. The thus-obtained nonwoven fabric may have small pore size and consequently may fail to exhibit the effect of suppressing an increase in pressure drop. If the die-collector distance is 30 cm or more, the degree of entanglement of fibers may increase. This may deteriorate the uniformity of the sheet especially when a nonwoven fabric having a low mass per unit area is intended to be produced. Such a nonwoven fabric having poor uniformity may have a reduced collection efficiency when used as a filter medium for filters.

The mixed-fiber nonwoven fabric of embodiments of the present invention comprises fiber groups A and B into which fibers are categorized based on their fiber diameters. Fiber group A has a fiber diameter of 5.0 μm or less, preferably 2.0 μm or less. If fiber group A has a fiber diameter of more than 5.0 μm, the fiber surface area of the nonwoven fabric decreases, which results in an insufficient collection efficiency. The fiber diameter of fiber group A may be very small in order to achieve a high collection efficiency as long as the diameter is 2.0 μm or less, but the lower limit of the diameter is about 0.10 μm in practice.

The fibers in fiber group B are coarse fibers having a fiber diameter of 50.0 μm or more. If fiber group B has a fiber diameter of less than 50.0 μm, the nonwoven fabric has small pore size, which results in an insufficient effect of reducing pressure drop. Fiber group B may have a very large fiber diameter, but the upper limit of the diameter is about 200 μm in practice. If fibers having a fiber diameter of more than 200 μm are present in fiber group B, it becomes difficult to homogeneously mix fiber group B with fiber group A especially when a nonwoven fabric having a low mass per unit area is intended to be produced, and consequently the nonwoven fabric may have insufficient collection performance. The fiber diameter of the fibers contained in fiber group B is more preferably 100.0 μm or less, even more preferably less than 70.0 μm.

The mixed-fiber nonwoven fabric of the present invention may further comprise, in addition to fiber group A and fiber group B, fibers having a fiber diameter of more than 5.0 μm and less than 50.0 μm (fiber group C).

In order to achieve a low pressure drop and a high collection efficiency, the mixed-fiber nonwoven fabric of the present invention preferably comprises fiber group A at a volume fraction of 20 to 80 vol %, fiber group B at a volume fraction of 1 to 40 vol %, and fiber group C at a volume fraction of 0 to 79 vol %, and preferably comprises fiber group A at a volume fraction of 30 to 70 vol %, fiber group B at a volume fraction of 5 to 30 vol %, and fiber group C at a volume fraction of 0 to 65 vol %.

If the volume fraction of fiber group A is less than 20 vol %, the nonwoven fabric has a smaller fiber surface area. This may result in an insufficient collection efficiency especially when the nonwoven fabric has a low mass per unit area. This also may result in an increase in the production cost of the nonwoven fabric when the nonwoven fabric having a higher mass per unit area is intended to be produced to achieve a sufficient collection efficiency. If the volume fraction of fiber group A is more than 80 vol %, the pores in the nonwoven fabric decreases, which increases pressure drop.

If the volume fraction of fiber group B is less than 1 vol %, the pores in the nonwoven fabric do not increase, which results in an increased pressure drop. If the volume fraction of fiber group B is more than 40 vol %, the nonwoven fabric has a relatively small fiber surface area, which results in an insufficient collection efficiency.

The ratio of the median fiber diameter (B') of fiber group B to the median fiber diameter (A') of fiber group A (B'/A') is 35 or more, preferably 40 or more. If the ratio of (B'/A') (the ratio of the two median fiber diameters (B' to A')) is less than 35, too coarse fibers in fiber group A will reduce the fiber surface area of the nonwoven fabric and consequently will reduce collection efficiency, or too fine fibers in fiber group B will prevent an increase in the pores in the nonwoven fabric and consequently the nonwoven fabric cannot exhibit sufficient collection performance such as a low pressure drop and a high collection efficiency. The ratio of (B'/A') may be very large as long as the ratio is 35 or more, but the upper limit of the ratio is about 150 in practice. If the ratio of (B'/A') is more than 150, fiber group A may not be homogeneously mixed with fiber group B in a sheet.

The mixed-fiber nonwoven fabric of the present invention is suitably used for an air filter with high collection performance and therefore the mixed-fiber nonwoven fabric preferably exhibits a collection efficiency of 99.90% or more for polystyrene particles having a particle diameter of 0.3 to 0.5 μm at a filtration velocity of 4.5 m/min and exhibits a QF of 0.20 or more, and more preferably exhibits a collection efficiency of 99.92% or more and a QF of 0.22 or more.

The mixed-fiber nonwoven fabric of the present invention preferably has a mass per unit area of 10 to 80 g/m$^2$, more preferably 15 to 70 g/m$^2$, even more preferably 20 to 60 g/m$^2$.

If the mass per unit area is less than 10 g/m$^2$, the nonwoven fabric has a small number of fibers in the thickness direction and can thus exhibit a low pressure drop. However, the number of fibers capable of collecting dust is also small, which may result in an insufficient collection efficiency. If the mass per unit area is more than 80 g/m$^2$, the number of fibers capable of collecting dust is large and thus the nonwoven fabric can exhibit a high collection efficiency. However, the increased number of the fibers is likely to result in a high pressure drop. The mass per unit area of more than 80 g/m$^2$ is also not preferable in view of the production cost of the nonwoven fabric.

The mixed-fiber nonwoven fabric of the present invention preferably satisfies the following inequality, in terms of the relation between the collection efficiency (%) for polystyrene particles having a particle diameter of 0.3 to 0.5 μm at a filtration velocity of 4.5 m/min and the mass per unit area (g/m$^2$).

$-\mathrm{Log}(1-[\text{collection efficiency}]/100)/[\text{mass per unit area}] \geq 0.1$ The value expressed by the left side of the inequality corresponds to a collection efficiency for a mass per unit area of 10 g/m$^2$. Generally when a filter medium has a larger mass per unit area, the filter medium exhibits a higher collection efficiency. However, a larger mass per unit area is disadvantageous in terms of the cost. When the collection efficiency for a mass per unit area of 10 g/m$^2$ is more than 0.1, the mixed-fiber nonwoven fabric having a small mass per unit area can achieve the collection efficiency required for a filter medium for air filters, and further this embodiment is economically advantageous.

The mixed-fiber nonwoven fabric of the present invention preferably has a thickness of 0.05 to 1.60 mm, more preferably 0.10 to 1.00 mm. If the thickness is less than 0.05 mm, the nonwoven fabric with reduced bulkiness may exhibit a high pressure drop. If the nonwoven fabric having a thickness of more than 1.60 mm is used as a pleated filter, it may be impossible to reduce the width of pleats.

The mixed-fiber nonwoven fabric of the present invention is preferably subjected to electret treatment to yield an electret nonwoven fabric. The electret nonwoven fabric can exhibit electrostatic adsorption effect, thereby achieving a much lower pressure drop and a much higher collection efficiency.

The electret treatment is preferably performed by providing water to the nonwoven fabric of the present invention and then drying the nonwoven fabric to give a high-performance mixed-fiber nonwoven fabric. Water is provided to the nonwoven fabric by, for example, a method in which water jet streams or water droplet streams are sprayed on the nonwoven fabric at a sufficient pressure to allow the water to infiltrate into the nonwoven fabric; a method in which, after or while water is provided to the nonwoven fabric, the water is sucked from the one side of the nonwoven fabric so as to infiltrate into the nonwoven fabric; a method in which the nonwoven fabric is immersed in a mixed solution of water and a water-soluble organic solvent such as isopropyl alcohol, ethyl alcohol, and acetone to allow the water to infiltrate into the nonwoven fabric; or the like.

The fibers constituting the mixed-fiber nonwoven fabric of the present invention preferably comprise at least one compound selected from the group consisting of a hindered amine compound and a triazine compound in order to achieve improved weatherability and improved electret properties.

The nonwoven fabric comprising such a compound can be produced by, for example, a method in which the compound and a non-conductive material are first kneaded with a kneading extruder, a static mixer, or the like to prepare master chips and then the master chips are melted in an extruder and fed to a spinneret; a method in which a mixture of a non-conductive material and the compound is fed to an extruder hopper of a spinning machine, then kneaded in the extruder and directly fed to a spinneret; a method in which a non-conductive material and the compound are fed to separate extruder hoppers, the flows of the compound and the material are merged into a single flow so that they are blended, and then the blend is melted and kneaded in an extruder and fed to a spinneret; or the like.

Examples of the hindered amine compound include poly[(6-(1,1,3,3-tetramethylbutyl)imino-1,3,5-triazine-2,4-diyl)((2,2,6,6-tetramethyl-4-piperidyl)imino)hexamethylene ((2,2,6,6-tetramethyl-4-piperidyl)imino)] (manufactured by BASF Japan Ltd., "CHIMASSORB" (registered trademark) 944 LD), a polycondensate of dimethyl succinate with 1-(2-hydroxyethyl)-4-hydroxy-2,2,6,6-tetramethylpiperidine (manufactured by BASF Japan Ltd., "TINUVIN" (registered trademark) 622 LD), and bis(1,2,2,6,6-pentamethyl-4-piperidyl)-2-(3,5-di-t-butyl-4-hydroxybenzyl)-2-n-butylmalonate (manufactured by BASF Japan Ltd., "TINUVIN" (registered trademark) 144).

Examples of the triazine additive include the above-described poly[(6-(1,1,3,3-tetramethylbutyl)imino-1,3,5-triazine-2,4-diyl)((2,2,6,6-tetramethyl-4-piperidyl)imino)hexamethylene((2,2,6,6-tetramethyl-4-piperidyl)imino)] (manufactured by BASF Japan Ltd., "CHIMASSORB" (registered trademark) 944 LD) and 2-(4,6-diphenyl-1,3,5-triazin-2-yl)-5-((hexyl)oxy)-phenol (manufactured by BASF Japan Ltd., "TINUVIN" (registered trademark) 1577 FF). Among them, the hindered amine compounds are particularly preferred.

In cases where the hindered amine compound and/or the triazine compound is contained in the polyolefin fibers in the mixed-fiber nonwoven fabric, the amount of the compound(s) is preferably 0.5 to 5.0% by mass, more preferably 0.7 to 3% by mass, relative to the total mass of the nonwoven fabric. In cases where the hindered amine compound and/or the triazine compound are attached to the surface of the nonwoven fabric or the surface of the fibers, the amount of the compound(s) is preferably 0.1 to 5.0% by mass relative to the total mass of the nonwoven fabric.

The mixed-fiber nonwoven fabric may comprise, in addition to the above compounds, additives commonly used in electret nonwoven fabrics, such as a heat stabilizer, a weathering agent, and a polymerization inhibitor.

The mixed-fiber nonwoven fabric of the present invention may be stacked on another sheet to yield a laminated nonwoven fabric. For example, the mixed-fiber nonwoven fabric of the present invention can be stacked on another sheet having higher rigidity than the mixed-fiber nonwoven fabric to yield a product with improved strength. In another example, the mixed-fiber nonwoven fabric of the present invention can be combined with another sheet having a deodorizing function, an antibacterial function, or the like. The lamination can be performed by, for example, a method in which two types of nonwoven fabrics are bonded with an adhesive; a method in which a nonwoven fabric is formed by melt-blowing process on another nonwoven fabric produced by a process other than melt-blowing process so as to be stacked; or the like. The bonding of two types of nonwoven fabrics may be performed by other methods, for example, a method in which a moisture curable urethane resin is sprayed on a nonwoven fabric; a method in which a thermoplastic resin or a thermally fusible fiber is dispersed on a nonwoven fabric, another nonwoven fabric is stacked thereon, and the nonwoven fabrics are passed through a heater so as to bond together; or the like. The bonding of two types of nonwoven fabrics may be performed by any method as long as the two types of nonwoven fabrics are bonded together. However, since the nonwoven fabric of the present invention is intended to be used as a filter, such a bonding method that could increase pressure drop is not preferred. On this account, a spraying method using a moisture curable urethane resin is preferred because the method can bond two nonwoven fabrics without pressing the fabrics and thus may not cause an increase in the pressure drop due to bonding.

The mixed-fiber nonwoven fabric of the present invention can be used as a filter medium for filters. The filter medium is suitable for air filters in general and is especially suitable for high-performance applications such as filters for air conditioners, filters for air cleaners, and automotive cabin filters, but the application of the filter medium is not limited thereto.

EXAMPLES

The mixed-fiber nonwoven fabric of embodiments of the present invention will be more specifically described with reference to Examples. The characteristic values in Examples were determined by the following measurement methods.
(1) Mass Per Unit Area
From a nonwoven fabric, three pieces each 15 cm in length and 15 cm in width were cut out and the masses of the pieces were measured. The obtained values were converted into the values per square meter and the mean value was calculated to yield a mass per unit area ($g/m^2$).
(2) Fiber Diameter, Median Fiber Diameter, and Volume Fraction
From an arbitrary area of a nonwoven fabric, 30 samples each 1 cm in length and 1 cm in width were cut out. The fiber surfaces of the samples were observed with a scanning electron microscope at an appropriate magnification and one photograph was taken for each sample (30 photographs in total). The magnification was 200 to 3,000 times. In the photograph, all the fibers whose diameters were clearly observed were selected, the diameters of the fibers were measured, and the values were rounded to the nearest 0.1 µm.

Of the measured fibers, the fibers having a diameter that is classified into fiber group A (having a fiber diameter of 5.0 µm or less) or fiber group B (having a fiber diameter of 50.0 µm or more) were subjected to the calculation of the median fiber diameters. The volume fractions of fiber group A, fiber group B, and fiber group C (having a fiber diameter of more than 5.0 µm and less than 50.0 µm) were calculated from the obtained fiber diameters in accordance with the following formulae. The volumes herein were calculated on the assumption that the fibers contained in each fiber group have a constant length (X).

Volume of each fiber: $Y=\pi(\text{fiber diameter}/2)^2 \times X$

Volume of fiber group $A$: $Z(A)$=sum of all $Y$ in fiber group $A$

Volume of fiber group $B$: $Z(B)$=sum of all $Y$ in fiber group $B$

Volume of fiber group $C$: $Z(C)$=sum of all $Y$ in fiber group $C$

Volume fraction (vol %) of fiber group $A=Z(A)/[Z(A)+Z(B)+Z(C)]$

Volume fraction (vol %) of fiber group $B=Z(B)/[Z(A)+Z(B)+Z(C)]$

Volume fraction (vol %) of fiber group $C=Z(C)/[Z(A)+Z(B)+Z(C)]$ (3) Collection Efficiency and Pressure Drop From five places in the longitudinal direction of a nonwoven fabric, samples each 15 cm in length and 15 cm in width were cut out. The collection efficiency and the pressure drop of each sample were determined with the collection efficiency measurement device shown in FIG. 1. The collection efficiency measurement device includes a sample holder 1 to hold a measurement sample M. The upstream of the sample holder 1 is connected to a dust storing box 2, and the downstream of the sample holder 1 is connected to a flow meter 3, a flow control valve 4, and a blower 5. The sample holder 1 is equipped with a particle counter 6 and the number of dust particles can be counted at each of the upstream and downstream sides of the measurement sample M by operating a switch cock 7. The sample holder 1 also equipped with a pressure gauge 8, which can indicate the static pressure difference between the upstream side and the downstream side of the measurement sample M. The collection efficiency was determined as follows. A 10% polystyrene 0.309U solution (available from Nacalai Tesque, Inc.) was diluted 200-fold with distilled water and placed in the dust storing box 2. Next, the measurement sample M was placed in the sample holder 1. Airflow was adjusted with the flow control valve 4 so that the air passed through the filter (sample) at a velocity of 4.5 m/min. The dust concentration was maintained at a range of 10,000 to 40,000 particles/$2.83 \times 10^{-4}$ m$^3$ (0.01 ft$^3$). The number of dust particles at the upstream side (D) and the number of dust particles at the downstream side (d) were measured for the sample M using the particle counter 6 (KC-01B manufactured by RION Co., Ltd.). The measurement was repeated three times for each sample. The collection efficiency (%) for particles having a diameter of 0.3 to 0.5 µm was calculated using the following formula based on JIS K 0901:1991 "Form, size and performance testing methods of filtration media for collecting airborne particulate matters". The mean value from the five samples was taken as a final collection efficiency result.

Collection efficiency (%)=$[1-(d/D)] \times 100$ (In the formula, d is the sum of the number of dust particles at the downstream side in three measurements, and D is the sum of the number of dust particles at the upstream side in three measurements.)

A nonwoven fabric capable of collecting more dust gives a smaller number of dust particles at the downstream side and therefore gives a higher collection efficiency.

The pressure drop was determined by reading the static pressure difference between the upstream side and the downstream side of the measurement sample M with the pressure gauge 8 during the measurement of the collection efficiency. The mean value from the five samples was taken as a final pressure drop result.

(4) QF

The value of QF (Pa$^{-1}$) as an index of the filtration performance is calculated from the collection efficiency (%) and the pressure drop (Pa) in accordance with the following formula. A higher value of QF indicates a lower pressure drop and a higher collection efficiency, i.e., better filtration performance.

$QF=-[\ln(1-\text{collection efficiency}/100)]/\text{pressure drop}$

Example 1

A polypropylene containing 1% by mass of "CHIMASSORB" (registered trademark) 944 (manufactured by BASF Japan Ltd.) (MFR=860) (α) and a polypropylene containing 1% by mass of "CHIMASSORB" (registered trademark) 944 (manufactured by BASF Japan Ltd.) (MFR=60) (β) were fed to separate extruders. The polymers were extruded, by meltblowing process, from a spinneret having five extrusion holes 0.25 mm in diameter (a) and one extrusion hole 0.60 mm in diameter (b) alternately arranged in a row (hole pitch: (a)-(b) was 2 mm, (a)-(a) was 1 mm; number of holes: (a) was 90, (b) was 20; width: 150 mm) under the conditions as follows: the rate of extrusion of the polymer (α) per spinneret hole (a) was 0.15 g/min·hole, the rate of extrusion of the polymer (β) per spinneret hole (b) was 0.90 g/min·hole, the nozzle temperature was 265° C., the air temperature was 285° C., and the air pressure was 0.10 MPa. The extruded polymers were collected on a collecting conveyor. The distance between the extrusion holes of the spinneret and the collecting conveyor was 20 cm. By controlling the speed of the collecting conveyor, a nonwoven fabric having a mass per unit area of 30 g/m$^2$ was obtained.

The obtained mixed-fiber nonwoven fabric was immersed in a mixed aqueous solution of pure water/isopropanol at a mass ratio of 70/30 and was allowed to naturally dry to yield an electret meltblown mixed-fiber nonwoven fabric. The characteristics of the electret meltblown nonwoven fabric were determined and the resulting values are shown in Table 1.

Example 2

A mixed-fiber nonwoven fabric having a mass per unit area of 30 g/m$^2$ was obtained in the same manner as in Example 1 except that the MFRs of the polypropylenes used in Example 1 were 1,550 (α) and 60 (β), that the rates of extrusion of the polymers (α, β) per hole (a, b) were 0.15 g/min·hole and 1.53 g/min·hole, respectively, that the air pressure was 0.13 MPa, and that the speed of the collecting conveyor was adjusted so as to give the same mass per unit area as in Example 1.

The obtained mixed-fiber nonwoven fabric was subjected to electret treatment in the same manner as in Example 1. The characteristics of the electret mixed-fiber nonwoven fabric were determined and the resulting values are shown in Table 1.

Example 3

A mixed-fiber nonwoven fabric having a mass per unit area of 30 g/m² was obtained in the same manner as in Example 1 except that the MFRs of the polypropylenes used in Example 1 were 860 (α) and 20 (β), that the rates of extrusion of the polymers (α, β) per hole (a, b) were 0.15 g/min·hole and 0.68 g/min·hole, respectively, that the air pressure was 0.10 MPa, and that the speed of the collecting conveyor was adjusted so as to give the same mass per unit area as in Example 1.

The obtained mixed-fiber nonwoven fabric was subjected to electret treatment in the same manner as in Example 1. The characteristics of the electret mixed-fiber nonwoven fabric were determined and the resulting values are shown in Table 1.

Comparative Example 1

A mixed-fiber nonwoven fabric having a mass per unit area of 30 g/m² was obtained in the same manner as in Example 1 except that the MFRs of the polypropylenes used in Example 1 were 1,550 (α) and 60 (β), that the rates of extrusion of the polymers (α, β) per hole (a, b) were 0.15 g/min·hole and 1.53 g/min·hole, respectively, that the air pressure was 0.05 MPa, that the distance between the extrusion holes of the spinneret and the collecting conveyor was 30 cm, and that the speed of the collecting conveyor was adjusted so as to give the same mass per unit area as in Example 1.

The obtained mixed-fiber nonwoven fabric was subjected to electret treatment in the same manner as in Example 1. The characteristics of the electret mixed-fiber nonwoven fabric were determined and the resulting values are shown in Table 1.

Comparative Example 2

A mixed-fiber nonwoven fabric having a mass per unit area of 30 g/m² was obtained in the same manner as in Example 1 using the same polypropylenes (α, β) as used in Example 1 except that the rates of extrusion of the polymers (α, β) per hole (a, b) were 0.19 g/min·hole and 0.83 g/min·hole, respectively, that the nozzle temperature was 255° C., that the air temperature was 265° C., that the air pressure was 0.13 MPa, and that the speed of the collecting conveyor was adjusted so as to give the same mass per unit area as in Example 1.

The obtained mixed-fiber nonwoven fabric was subjected to electret treatment in the same manner as in Example 1. The characteristics of the electret mixed-fiber nonwoven fabric were determined and the resulting values are shown in Table 1.

Comparative Example 3

A mixed-fiber nonwoven fabric having a mass per unit area of 30 g/m² was obtained in the same manner as in Example 1 using the same polypropylenes (α, β) as used in Example 1 except that the rate of extrusion of the polymer (β) per hole (b) was 0.70 g/min·hole, that the nozzle temperature was 255° C., that the air temperature was 265° C., that the air pressure was 0.13 MPa, and that the speed of the collecting conveyor was adjusted so as to give the same mass per unit area as in Example 1.

The obtained mixed-fiber nonwoven fabric was subjected to electret treatment in the same manner as in Example 1. The characteristics of the electret mixed-fiber nonwoven fabric were determined and the resulting values are shown in Table 1.

Comparative Example 4

A mixed-fiber nonwoven fabric having a mass per unit area of 30 g/m² was obtained in the same manner as in Example 1 using only the polypropylene (a) used in Example 1 except that the rates of extrusion of the polymer (α) per hole (a, b) were 0.19 g/min·hole and 1.38 g/min·hole, respectively, that the nozzle temperature was 255° C., that the air temperature was 265° C., that the air pressure was 0.15 MPa, and that the speed of the collecting conveyor was adjusted so as to give the same mass per unit area as in Example 1.

The obtained mixed-fiber nonwoven fabric was subjected to electret treatment in the same manner as in Example 1. The characteristics of the electret mixed-fiber nonwoven fabric were determined and the resulting values are shown in Table 1.

TABLE 1

|  |  | Example 1 | Example 2 | Example 3 | Comparative Example 1 | Comparative Example 2 | Comparative Example 3 | Comparative Example 4 |
|---|---|---|---|---|---|---|---|---|
| Composition | α | PP | PP | PP | PP | PP | PP | PP |
| of material | β | PP | PP | PP | PP | PP | PP | — |
| MFR* of material | α | 860 | 1550 | 860 | 1550 | 860 | 860 | 860 |
|  | β | 60 | 60 | 20 | 60 | 60 | 60 | — |
| Mass per unit area (g/m²) |  | 30 | 30 | 30 | 30 | 30 | 30 | 30 |
| Median fiber | A' | 1.3 | 1.0 | 1.5 | 2.0 | 2.0 | 1.3 | 1.4 |
| diameter (μm) | B' | 52.6 | 51.2 | 55.7 | 67.3 | 53.9 | Not contained | Not contained |
| Maximum fiber diameter (μm) |  | 65.4 | 60.8 | 60.9 | 83.8 | 66.1 | 47.3 | 18.5 |
|  | B'/A' | 41.7 | 50.2 | 37.6 | 33.8 | 27.6 | — | — |
| Volume fraction (%) | Fiber group A | 53 | 32 | 27 | 17 | 16 | 56 | 40 |
|  | Fiber group B | 9 | 15 | 10 | 68 | 11 | — | — |
|  | Fiber group C | 38 | 53 | 63 | 15 | 73 | 44 | 60 |

TABLE 1-continued

|  | Example 1 | Example 2 | Example 3 | Comparative Example 1 | Comparative Example 2 | Comparative Example 3 | Comparative Example 4 |
|---|---|---|---|---|---|---|---|
| Pressure drop (Pa) | 36.3 | 39.1 | 34.1 | 11.2 | 35.5 | 45.0 | 58.5 |
| Collection efficiency (%) | 99.98 | 99.98 | 99.86 | 94.30 | 99.19 | 99.90 | 99.62 |
| QF (Pa$^{-1}$) | 0.23 | 0.22 | 0.19 | 0.26 | 0.14 | 0.15 | 0.10 |

*MFR of material (melt flow rate): g/10 min (230° C., 21.2N)

As apparent from Table 1, in each of Examples 1 to 3 of the present invention, the adjustment of the MFRs of the materials, the spinning temperature, the air pressure, and the extrusion rates per hole allows fiber group A (having a fiber diameter of 5 μm or less) and fiber group B (having a fiber diameter of 50.0 μm or more) to be mixed together, thereby yielding mixed-fiber nonwoven fabrics having a ratio of (B'/A') (the ratio of the median fiber diameter (B') of fiber group B to the median fiber diameter (A') of fiber group A) of 35 or more. The mixed-fiber nonwoven fabrics showed a low pressure drop and a high collection efficiency.

In contrast, in Comparative Examples 1 and 2, even though fiber group A and fiber group B were mixed together, fiber group A was present at a volume fraction of 20% or less and the ratio of (B'/A') was less than 35. Thus, Comparative Example 1 showed an insufficient collection efficiency and Comparative Example 2 showed a low value of QF.

Comparative Examples 3 and 4, which contained no fiber group B, showed a higher pressure drop and a lower value of QF.

As described above, in embodiments of the present invention, the fiber diameters of the fine fibers and the coarse fibers contained in a mixed-fiber nonwoven fabric and the ratio of the median diameters of these fibers were adjusted to the specified ranges, thereby yielding a nonwoven fabric exhibiting a low pressure drop and an excellent collection efficiency.

REFERENCE SIGNS LIST

1: Sample holder
2: Dust storing box
3: Flow meter
4: Flow control valve
5: Blower
6: Particle counter
7: Switch cock
8: Pressure gauge
M: Sample for measurement

The invention claimed is:

1. A nonwoven fabric comprising mixed fibers having different fiber diameters, the mixed-fiber nonwoven fabric comprising
    fiber group A, which is a group of self-bonding fibers having a fiber diameter of 5.0 μm or less;
    fiber group B, which is a group of self-bonding fibers having a fiber diameter of 50.0 μm or more; and
    fiber group C, which is an optional group of self-bonding fibers having a fiber diameter of more than 5.0 μm and less than 50.0 μm,
    fiber group A being present at a volume fraction of 20 to 80 vol %, fiber group B being present at a volume fraction of 1 to 40 vol %, and fiber group C being present at a volume fraction of 0 to 79 vol %, relative to the total volume of the fibers, and
    fiber group A having a median fiber diameter (A'), fiber group B having a median fiber diameter (B'), and the ratio of (B'/A') being 35 or more.

2. The mixed-fiber nonwoven fabric according to claim 1, wherein fiber group A is present at a volume fraction of 30 to 70 vol %, fiber group B is present at a volume fraction of 5 to 30 vol %, and fiber group C is present at a volume fraction of 0 to 65 vol %.

3. The mixed-fiber nonwoven fabric according to claim 1 or 2, which is made according to a melt-blowing process comprising the steps of:
    extruding one or more polymers through a spinneret having a plurality of flow passages, wherein the same or different polymer flows through each flow passage to form the self-bonding fibers,
    mixing the self-bonding fibers to provide mixed fibers, and
    bonding the mixed fibers together into the nonwoven fabric.

4. The mixed-fiber nonwoven fabric according to claim 1 or 2, wherein fiber group A or fiber groups A and B comprise a polyolefin fiber.

5. The mixed-fiber nonwoven fabric according to claim 1 or 2, which has a mass per unit area of 10 to 80 g/m2.

6. The mixed-fiber nonwoven fabric according to claim 1 or 2, which is an electret-treated nonwoven fabric.

7. The mixed-fiber nonwoven fabric according to claim 1 or 2, which has a collection efficiency of 99.9% or more for polystyrene particles having a particle diameter of 0.3 to 0.5 μm at a filtration velocity of 4.5 m/min and has a QF of 0.20 or more.

8. A filter medium comprising the mixed-fiber nonwoven fabric according to claim 1 or 2.

9. A production method for a nonwoven fabric comprising mixed fibers having different fiber diameters by a melt-blowing process comprising the steps of:
    extruding one or more polymers through a spinneret having a plurality of flow passages to provide the mixed fibers, wherein the same or different polymer flows through each flow passage such that the mixed fibers comprise a fiber group A of self-bonding fibers, a fiber group B of self-bonding fibers, and an optional fiber group C of self-bonding fibers, and
    bonding together the mixed fibers into the nonwoven fabric,
    wherein in the non-woven fabric:
    the fiber group A comprises fibers having a fiber diameter of 5.0 μm or less;
    the fiber group B comprises fibers having a fiber diameter of 50.0 μm or more; and
    the fiber group C comprises fibers having a fiber diameter of more than 5.0 μm and less than 50.0 μm,
    fiber group A being present at a volume fraction of 20 to 80 vol %, fiber group B being present at a volume fraction of 1 to 40 vol %, and fiber group C being present at a volume fraction of 0 to 79 vol %, relative to the total volume of the fibers, and fiber group A having a median fiber diameter (A'), fiber group B having a median fiber diameter (B'), and the ratio of (B'/A') being 35 or more.

10. The production method for the mixed-fiber nonwoven fabric according to claim 9, wherein fiber group A is present at a volume fraction of 30 to 70 vol %, fiber group B is present at a volume fraction of 5 to 30 vol %, and fiber group C is present at a volume fraction of 0 to 65 vol %.

11. The production method for the mixed-fiber nonwoven fabric according to claim 9 or 10, wherein fiber group A or fiber groups A and B comprise a polyolefin fiber.

12. The production method for the mixed-fiber nonwoven fabric according to claim 9 or 10, which has a mass per unit area of 10 to 80 g/m2.

13. The production method for the mixed-fiber nonwoven fabric according to claim 9 or 10, which is an electret-treated nonwoven fabric.

14. The production method for the mixed-fiber nonwoven fabric according to claim 9 or 10, which has a collection efficiency of 99.9% or more for polystyrene particles having a particle diameter of 0.3 to 0.5 µm at a filtration velocity of 4.5 m/min and has a QF of 0.20 or more.

* * * * *